(12) United States Patent
Tourancheau et al.

(10) Patent No.: US 7,191,422 B1
(45) Date of Patent: Mar. 13, 2007

(54) SYSTEM AND METHOD FOR DETERMINING A CARRIER LAYOUT USING CORNERED CHIP-TO-CHIP INPUT/OUTPUT

(75) Inventors: Bernard Tourancheau, Miribel (FR); Xavier-Francois Vigouroux, Brie et Angonnes (FR); Cedric Koch-Hofer, Saint Martin d'Heres (FR)

(73) Assignee: Sun Microsystems, Inc., Santa Clara, CA (US)

( * ) Notice: Subject to any disclaimer, the term of this patent is extended or adjusted under 35 U.S.C. 154(b) by 392 days.

(21) Appl. No.: 10/853,936

(22) Filed: May 26, 2004

(51) Int. Cl.
*G06F 17/50* (2006.01)
(52) U.S. Cl. .......................... 716/10; 716/12
(58) Field of Classification Search ............... 716/8–15
See application file for complete search history.

(56) References Cited

U.S. PATENT DOCUMENTS 6,374,387 B1 * 4/2002 van den Berghe .......... 714/790
6,657,130 B2 * 12/2003 Van Dyke et al. .......... 174/255
7,045,718 B2 * 5/2006 Loibl ........................ 174/261
2005/0109535 A1 * 5/2005 Audet et al. ................ 174/260

OTHER PUBLICATIONS

Goeckel et al., "Increasing Diversity with Non-Standard Signal Sets in Wireless OFDM Systems," IEEE, 1999, pp. 20-24.*
Brisbin et al., "1-D and 2-D Hot Carrier Layout Optimization of N-LDMOS Transistor Arrays," IEEE, 2002, pp. 120-124.*

* cited by examiner

*Primary Examiner*—Vuthe Siek
(74) *Attorney, Agent, or Firm*—Park, Vaughan & Fleming, LLP

(57) ABSTRACT

A system and method for determining a carrier layout using cornered chip-to-chip input/output is presented. Each of a plurality of individual integrated circuit carriers communicatively interfaceable through cornered input/output ports is oriented at a uniform rotation relative to an edge of a carrier layout. Each carrier defines a set of rectilinear edges. Each carrier is placed juxtaposed at an open corner to at least one other carrier within a rectilinear lattice topologically arranged in the carrier layout to substantially minimize Hamming distances between each of the carriers.

17 Claims, 9 Drawing Sheets

70

80

81

82

SYSTEM AND METHOD FOR DETERMINING A CARRIER LAYOUT USING CORNERED CHIP-TO-CHIP INPUT/OUTPUT

GOVERNMENT LICENSE RIGHTS

This invention was made with United States Government support under Contract No. NBCH020055 awarded by the Defense Advanced Research Projects Administration. The United States Government has certain rights in the invention.

FIELD OF THE INVENTION

The invention relates in general to integrated circuit carrier layout and, in particular, to a system and method for determining a carrier layout using cornered chip-to-chip input/output.

BACKGROUND OF THE INVENTION

Conventionally, circuit carriers provide physical housings for integrated circuits and include a set of pins provided along the side or bottom of each carrier for interfacing the integrated circuit to an external environment. Each integrated circuit performs a specific function, such as processing or storage, and the integrated circuit and carrier combinations are generally generically termed chips. The individual carrier pins typically interconnect to a circuit board bus defining a shared electrical pathway for exchanging address, data and control signals with other components, such as individual processors, memories and input-output (I/O) devices. The complexity of a bus architecture increases exponentially with the number of carriers and address, data and control lines involved.

Asserting signals onto and receiving signals from a bus can be expensive in terms of mechanical, electrical and timing design considerations. For instance, propagating signals off-chip can tax the power budget allotted to each chip. Moreover, signal propagation between chips is slower over the bus in comparison to on-chip signal propagation, which can create a lower bound on inter-chip timing. Furthermore, bus skew, caused by signals on different bus lines traveling at different speeds, can further increase signal propagation delay.

Bypassing the conventional bus-based chip interconnection approach, chip-to-chip input/output (I/O) provides direct signal pathways between carriers. Chip-to-chip I/O simplifies routing through direct and immediate electrical pathways, proceeding from one chip directly to the next chip. Consequently, circuit board layout using chip-to-chip I/O requires arranging a matrix of functionally-defined carriers in an edge-to-edge topology. However, although more direct, through-chip hops can form bottlenecks in intermediate chips, particularly if the transient signal traffic is high in a few concentrated chips.

Cornered chip-to-chip I/O is a variation of chip-to-chip I/O that places the input/output signal connectors on the corners of each carrier. Cornered I/O allows increased spacing between the carriers to facilitate chip cooling, chip removal and installation, and eased troubleshooting. The borders of each carrier layout remain conventional square or rectangular designs with the edges of the individual carriers oriented parallel to the edges of each layout. With cornered I/O, spacing between adjacent rows and columns of carriers located along the edges of the layout remains unused and can form "holes." As a result, fewer potential connections are available along the borders with respect to those carriers located in either a corner or along a side of the layout. Connectivity is thereby reduced and overall robustness suffers due to a decreased number of available alternative pathways. Moreover, as carriers located in the corners provide only a single chip-to-chip I/O pathway, a potential single point of failure is formed. As well, two routes between each peer carrier cannot be guaranteed and a layout can suffer non-attainable neighbors.

Therefore, there is a need for an approach to providing an efficient topological layout of cornered chip-to-chip I/O carriers such that inter-chip routing is strengthened through alternate pathways and redundancy. Preferably, such an approach would increase the symmetry, homogeneity and density of routing of chips while minimizing unused space.

There is further need for an approach to providing highly interconnectable carrier layouts with a rich set of potential interfaces. Preferably, such an approach would facilitate building interconnected matrixes of functionally-defined carrier layouts configured in one or more layers.

SUMMARY OF THE INVENTION

One embodiment provides a system and method for determining a carrier layout using cornered chip-to-chip input/output. Each of a plurality of individual integrated circuit carriers communicatively interfaceable through cornered input/output ports is oriented at a uniform rotation relative to an edge of a carrier layout. Each carrier defines a set of rectilinear edges. Each carrier is placed juxtaposed at an open corner to at least one other carrier within a rectilinear lattice topologically arranged in the carrier layout to substantially minimize Hamming distances between each of the carriers.

In the described embodiment, each chip-to-chop hop reflects a Hamming distance and corresponds to constant speed signal propagation along the side of one chip-to-chip carrier using cornered I/O. Thus, a zero hop connection is possible when two carriers touch at the corners. Diamond layout shapes lead to shorter average Hamming distances for comparable numbers of carriers in conventional square layout shapes. Table 1 shows, by way of example, the number of actual and average hops required to propagate signals between chips configured in N×M diamond and square layouts. The average of the Hamming distances $\overline{D}$ for each layout is calculated in accordance with equation (1):

$$\overline{D} = \frac{\sum_0^n h_i \cdot i}{\sum_0^n h_i} \quad (1)$$

where h comprises a number of hops in the walk and n comprises a length of the walk.

TABLE 1

| Carriers in # hope | Diamond | | | | | | | Square | | | | |
|---|---|---|---|---|---|---|---|---|---|---|---|---|
| | 9 | 25 | 49 | 81 | 121 | 169 | 225 | 13 | 41 | 85 | 145 | 221 |
| 0 | 4 | 4 | 4 | 4 | 4 | 4 | 4 | 4 | 4 | 4 | 4 | 4 |
| 1 | 4 | 4 | 4 | 4 | 4 | 4 | 4 | 4 | 4 | 4 | 4 | 4 |
| 2 | | 12 | 12 | 12 | 12 | 12 | 12 | 4 | 12 | 12 | 12 | 12 |
| 3 | | 4 | 4 | 4 | 4 | 4 | 4 | | 4 | 4 | 4 | 4 |
| 4 | | | 20 | 20 | 20 | 20 | 20 | | 12 | 20 | 20 | 20 |
| 5 | | | 4 | 4 | 4 | 4 | 4 | | | 4 | 4 | 4 |
| 6 | | | | 28 | 28 | 28 | 28 | | 4 | 20 | 28 | 28 |
| 7 | | | | 4 | 4 | 4 | 4 | | | | 4 | 4 |
| 8 | | | | | 36 | 36 | 36 | | | 12 | 28 | 36 |
| 9 | | | | | 4 | 4 | 4 | | | | | 4 |
| 10 | | | | | | 44 | 44 | | | 4 | 20 | 36 |
| 11 | | | | | | 4 | 4 | | | | | |
| 12 | | | | | | | 52 | | | | 12 | 28 |
| 13 | | | | | | | 4 | | | | | |
| 14 | | | | | | | | | | | 4 | 20 |
| 15 | | | | | | | | | | | | |
| 16 | | | | | | | | | | | | 12 |
| 17 | | | | | | | | | | | | |
| 18 | | | | | | | | | | | | 4 |
| Average | 0.50 | 1.67 | 2.92 | 4.20 | 5.50 | 6.81 | 8.13 | 1.00 | 2.80 | 4.71 | 6.67 | 8.64 |

As empirically shown with reference to Table 1, the number of hops as reflective of Hamming distance generally increases faster for square layouts. For instance, a square layout with 221 carriers requires about 0.5 more hops on average, resulting in about a six percent increased cost per communication over a diamond layout.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Figure 1:
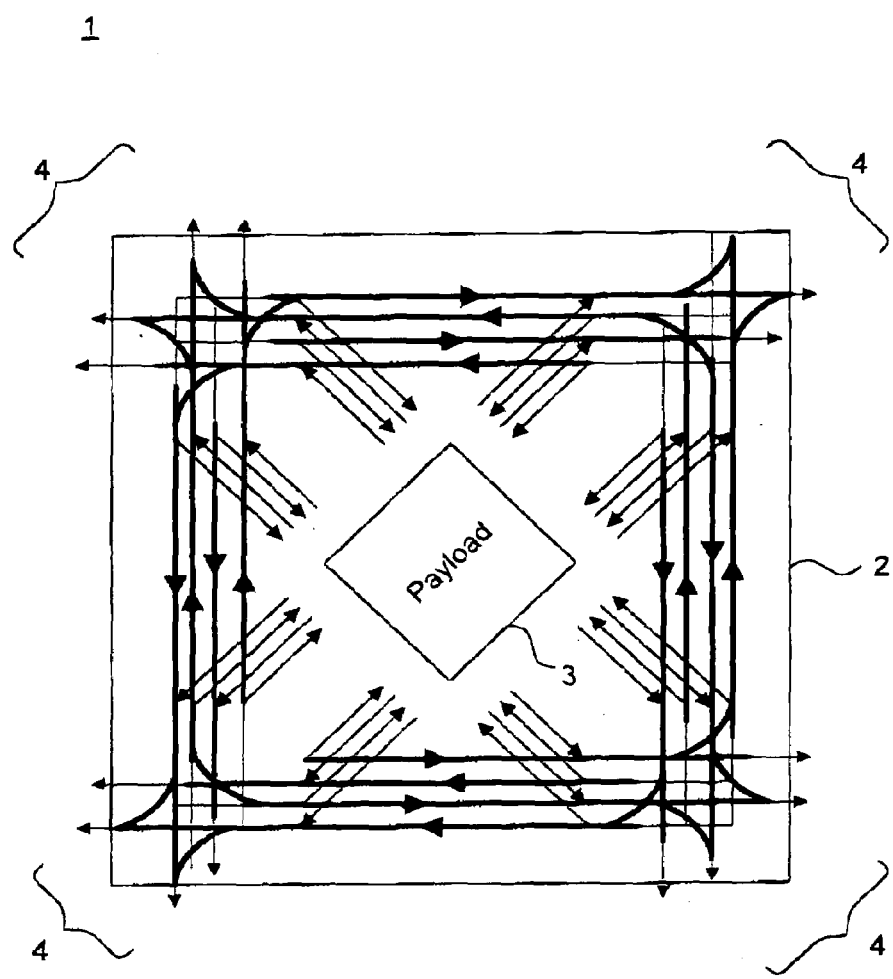
FIG. 1 is a functional block diagram showing a prior art chip using cornered I/O.

FIG. 1 is a functional block diagram showing a prior art chip 1 using cornered I/O. The chip 1 includes a carrier 2 and a functionally-defined integrated circuit payload 3. The payload 3 can include a processor, memory or I/O device, and is interfaced to other carriers by a set of cornered I/O interfaces 4 to provide chip-to-chip interconnections.

In the described embodiment, chips 1 overlap at the corners and a pair of two-dimensional grids are formed within each chip 1. The first grid forms a main network that includes the carrier side wires and switches and the second grid forms an access network connecting the payload 3 to carrier wires and switches, also referred to as I/O ports. Thus, the set of main networks formed by interconnected chips 1 logically define a crossbar switching network with access networks appearing within the crosses rotated at a 45-degree angle.

Communication between individual chips 1 is provided by packet routing. In the described embodiment, routing occurs between the payloads 3 using $\Delta X$ and $\Delta Y$. Each packet includes a header specifying a number of horizontal hops and number of vertical hops. Each hop is represented by a binary '1,' which is switched through logic gates at each intersection of main networks. For example a routing header of "11100 . . . 0, 1111100 . . . 0" represents three horizontal and five vertical hops. The routing through hops also enables the calculation of signal propagation delay as a function of Hamming distances.

Prior Art Partial Cornered Chip-to-Chip I/O Carrier Layout

Figure 2:
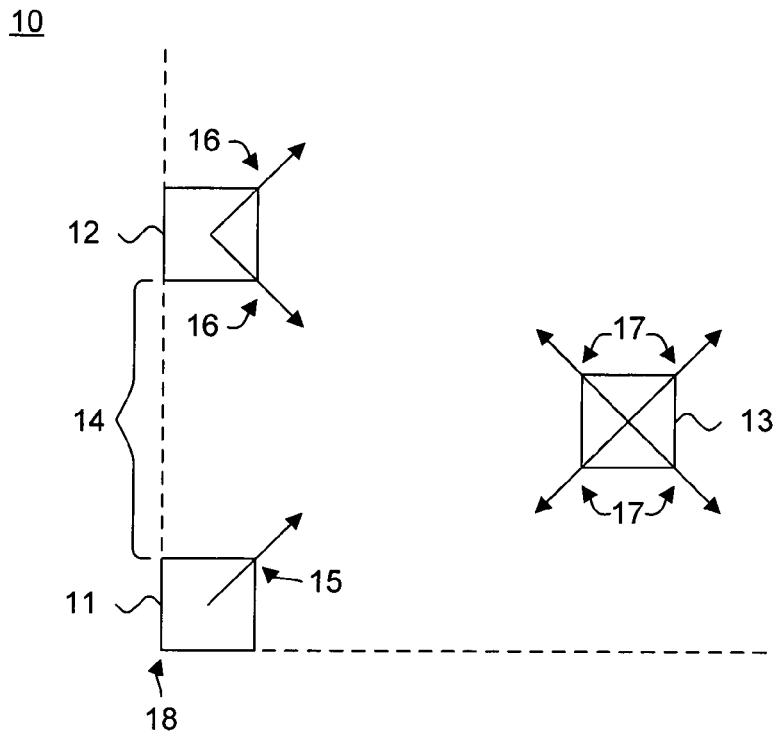
FIG. 2 is a block diagram showing, by way of example, a partial prior art cornered chip-to-chip I/O carrier layout.

FIG. 2 is a block diagram showing, by way of example, a partial prior art cornered chip-to-chip I/O carrier layout 10. The carrier layout 10 is oriented in a conventional square or rectangular configuration with the edges of each carrier oriented parallel to the border of the layout 10. A plurality of chip-to-chip I/O carriers 11, 12, 13 are arranged respectively at a corner, along a side and interior to the carrier layout 10. Each carrier 11, 12, 13 provides cornered I/O.

The enclosing edges of the carrier layout 10 form a square or rectangular configuration. Thus, the carrier 11 located in the corner of the carrier layout 10 provides only one cornered I/O interface 15 to other carriers in the carrier layout 10. Similarly, the carrier 12 located along a side of the carrier layout 10 provides two cornered I/O interfaces 16 to other carriers. Finally, the carrier 13 located interior to the carrier layout 10 provides four cornered I/O interfaces 17. Since corner carriers 11 and side carriers 12 are limited to interconnecting with other carriers along only those cornered I/O interfaces 15, 16 oriented towards the interior of the carrier layout 10, areas of unused space, referred to as "holes" 14, are formed along the edges of the carrier layout 10. In addition, the corner carriers 11, in particular, provide only a single cornered I/O interface 15, which violates the two routes between each peer property and creates a non-attainable neighbor problem. Furthermore, the single outward facing cornered I/O interface 18 of the corner carrier 11 limits the set of potential inter-carrier layout interfaces.

For a given square or rectangular carrier layout 10, the total number of carriers can be expressed by equation (2):

$$\left\lfloor \frac{N+1}{2} \right\rfloor \left\lfloor \frac{M+1}{2} \right\rfloor + \left\lfloor \frac{N}{2} \right\rfloor \left\lfloor \frac{M}{2} \right\rfloor \quad (2)$$

where M and N are positive integers. For a conventional square or rectangular carrier layout 10, the number of carriers to surface ratio R can be expressed by equation (3):

$$R = \begin{cases} \frac{1}{2} & \text{when } N \text{ or } M \text{ is even} \\ \frac{1}{2} + \frac{(N+M+1)}{4NM} & \text{when both } N \text{ and } M \text{ are odd} \end{cases} \quad (3)$$

Partial Cornered Chip-to-Chip Input/Output Carrier Layout

Figure 3:
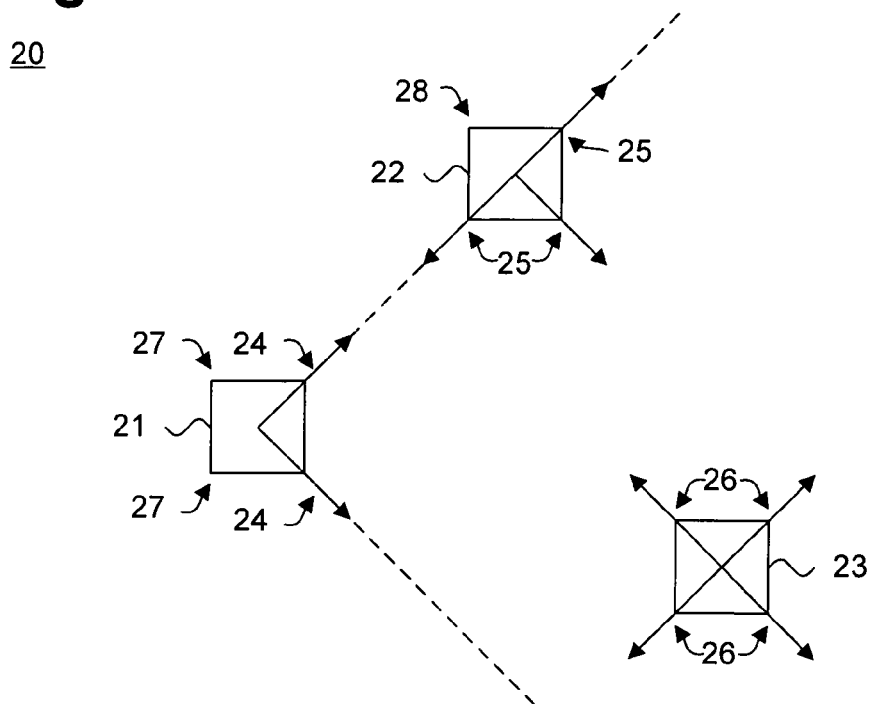
FIG. 3 is a block diagram showing, by way of example, a partial cornered chip-to-chip I/O carrier layout, in accordance with an embodiment of the invention.

FIG. 3 is a block diagram showing, by way of example, a partial cornered chip-to-chip I/O carrier layout 20, in accordance with an embodiment of the invention. A plurality of chip-To-chip I/O carriers 21, 22, 23 are arranged respectively at an extremity, along an edge and interior to the carrier layout 20. Each carrier 21, 22, 23 provides cornered I/O.

The enclosing edges of the carrier layout 20 form a "diamond" configuration. The diamond configuration 20 allows the individual carriers 21, 22, 23 to be arranged into a carrier layout that substantially eliminates the formation of holes 14. The rotated carrier layout requires no change in the mechanical structure of the individual carriers 21, 22, 23. By rotating the carrier layout 20, the carrier 21 located in the extremity of the carrier layout 20 provides two cornered I/O interfaces 24 to other carriers. The carrier 22 located along a edge of the carrier layout 20 provides three cornered I/O interfaces 25 to other carriers Finally, the carrier 23 located interior to the carrier layout 20 provides four cornered I/O interfaces 26 to other carriers. Thus, the edges of the carrier layout 20 are defined as logical pathways intersecting the cornered I/O interfaces 24, 25 of the carriers 21, 22 respectively located at each extremity and along the edges of the carrier layout 20. As a result, the homogeneity and chip routing density increases and the outward facing cornered I/O interfaces 27, 28 of the extremity and edge carriers 21, 22 provide a rich set of potential inter-carrier layout interfaces.

For a given rotated carrier layout 20, the total number of carriers can be expressed by equation (4):

$$N \times M \quad (4)$$

where N and M are positive integers. The number of carriers to surface ratio R can be expressed by equation (5):

$$R = \frac{NM}{NM} + (N-1)(M-1) + (N-1) + (M-1) + 1 = \frac{1}{2} \quad (5)$$

Hamming Distance Minimized Carrier Layouts

Figure 4:
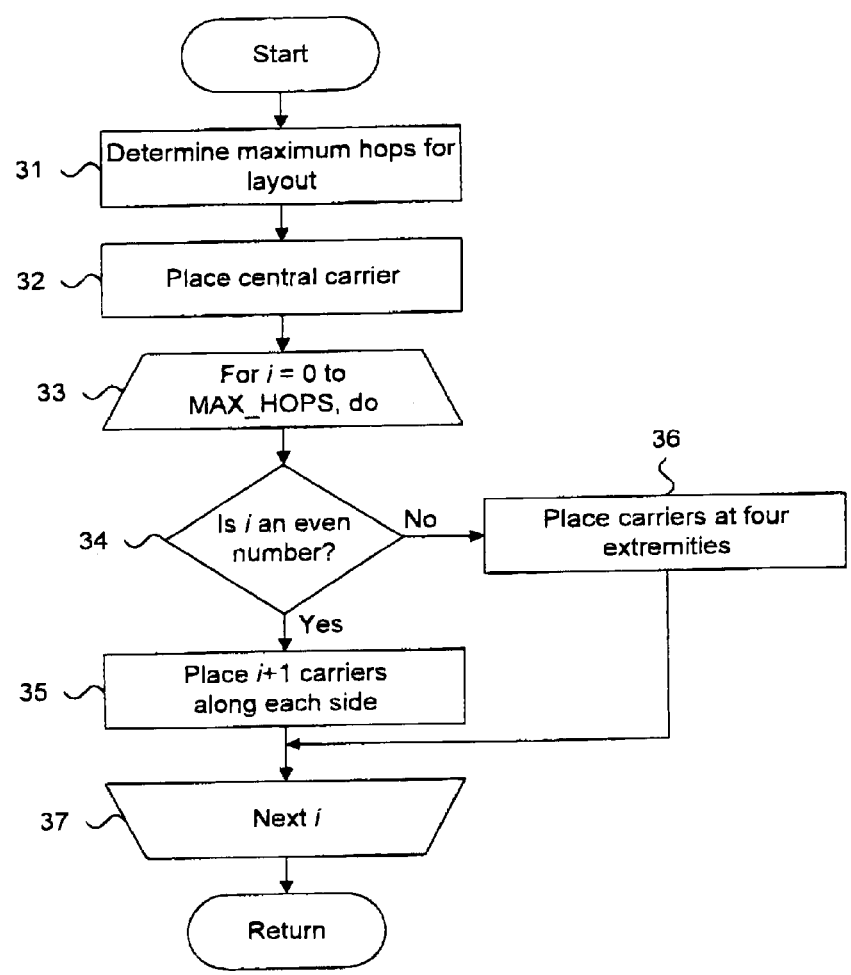
FIG. 4 is a flow diagram showing a method for determining a carrier layout to minimize Hamming distances.

FIG. 4 is a flow diagram showing a method 30 for determining a carrier layout to minimize Hamming distances. Conventional carrier layout design emphasizes maximizing the efficiency of signal exchange between a centralized processor and the various memory and I/O devices. The purpose of this method is to maximize the number of carriers for a given number of communication "hops," representing a given signal propagation latency reflected in Hamming distances.

Initially, the maximum number of hops for the carrier layout 20 is determined relative to a central carrier as a function of Hamming distance (block 31). The central carrier is placed in the carrier layout 20, preferably at the center block 32). Additional carriers are then iteratively placed to interface to the central carrier using cornered I/O (blocks 33–37) as follows. During each iteration (block 33), if the current number of hops is an even number (block 34), a number of carriers equal to the current number of hops plus one are placed along each side formed by those carriers already placed in the carrier layout (block 35). Otherwise, if the current number of hops is an odd number (block 34), carriers are placed at the four extremities of the carrier layout 20 (block 36). Processing continues with each successive hop (block 37), after which the method terminates.

Figure 5A:
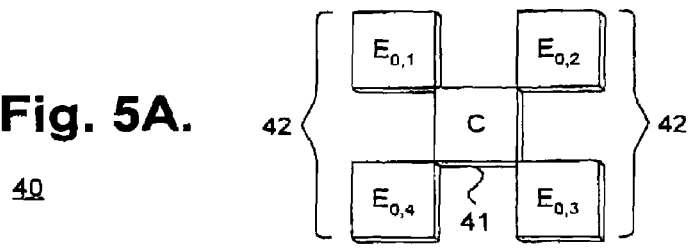
FIGS. 5A–C are block diagrams showing, by way of examples, cornered chip-to-chip I/O carrier layouts with minimized Hamming distances.
Figure 5B:
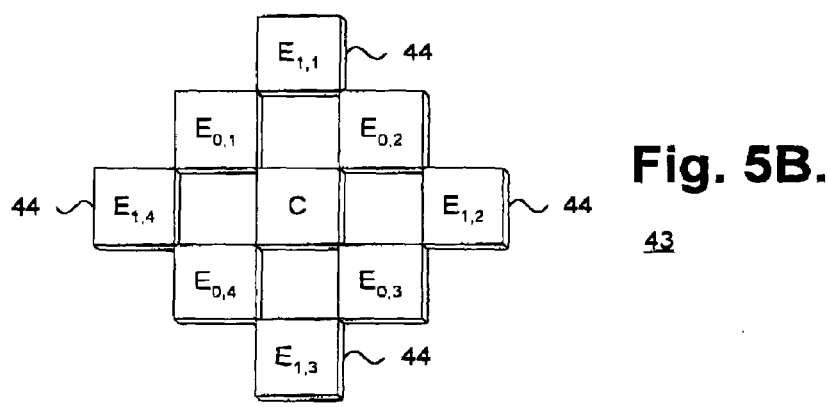
Figure 5C:
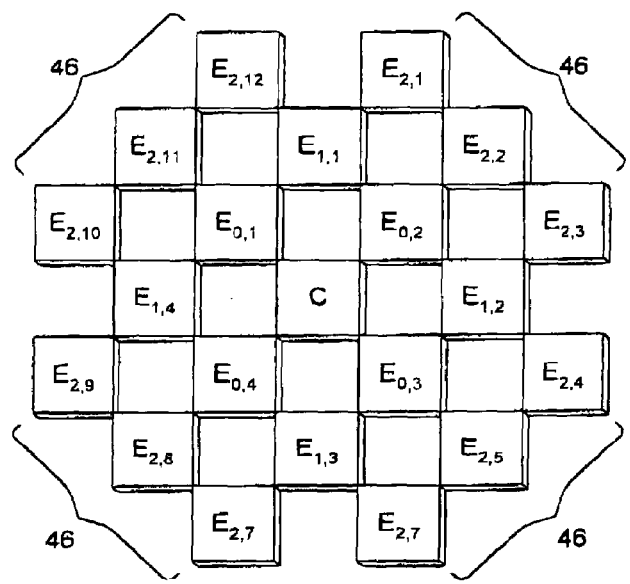

FIGS. 5A–C are block diagrams showing, by way of examples, cornered chip-to-chip I/O carrier layouts 40, 43, 45 with minimized Hamming distances. Each of the carrier layouts 40, 43, 45 are determined as logically defined "diamonds" rotated at 45-degree angle relative to the edge orientations of the constituent carriers. Referring first to FIG. 5A, a carrier layout 40 having a Hamming distance equal to zero is shown. A central carrier 41 interfaces to four carriers 42 placed at the corners of the already-placed central carrier 41. Referring next to FIG. 5B, a carrier layout 20 having a Hamming distance equal to one is shown. Four carriers 44 are placed along each edge formed by the already-placed carriers 42. Referring next to FIG. 5C, a carrier layout 45 having a Hamming distance equal to two is shown. A set of three carriers 46 is placed along each edge formed by the already-placed carriers 42, 44. Carrier layouts with even Hamming distances can also form non-isometric octagon carrier layouts, which can be used in forming overlapped carrier layout configurations, as further described below with reference to FIG. 6 et seq.

Thus, with each successive increase in Hamming distance, an additional layer of carriers is placed in the carrier layout, whereby the maximum worst case signal propagation latency delay between the center carrier 41 and any other carrier is constant.

Multi-Processor Carrier Layout Configurations

Multi-processor configurations can be created by combining two or more separate diamond carrier layouts 40, 43, 45 into an expanded diamond carrier layout by interfacing the individual diamond carrier layouts at the outward facing cornered I/O interfaces 27, 28 of the extremity and edge carriers 21, 22. Each diamond carrier layout displays constant signal propagation latency delay performance relative to the center carrier 41. When combined, memory accesses originating at one diamond carrier layout can be allowed to cross over to other diamond carrier layouts. However, cross-carrier layout memory accesses can also potentially create contentioned pathways in the external networks of those diamond carrier layouts being crossed. Contentioned pathways can be minimized by randomly placing the processor within the carrier layout configuration, randomly allocating memory to spread the data accesses over the configuration, or by a combination of random processor placement and random memory allocation. In a further embodiment, contentioned pathways are further minimized by shifting carrier layout columns, rows, or both to minimize cross-carrier layout traffic.

Figure 6B:
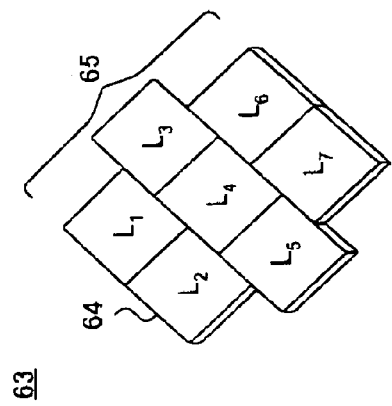
FIGS. 6A–C are block diagrams showing, by way of examples, multi-processor carrier layout configurations.
Figure 6C:
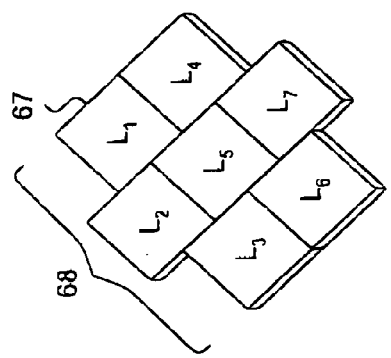
Figure 6A:
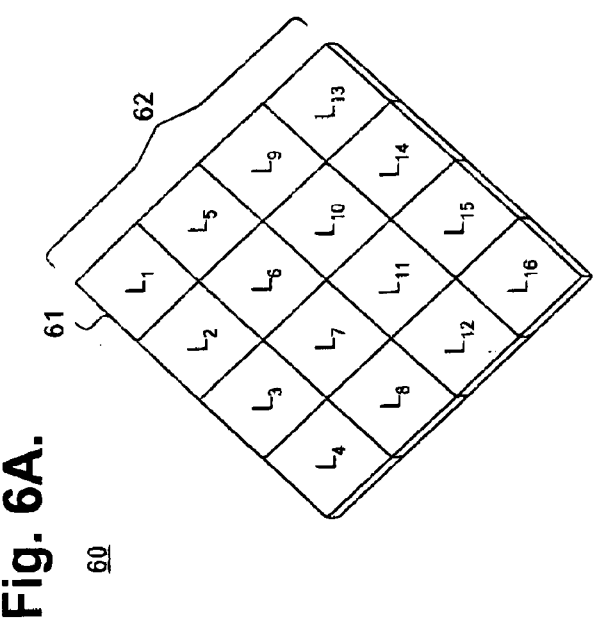

FIGS. 6A–C are block diagrams showing, by way of examples, multi-processor carrier layout configurations 60, 63, 66. Referring first to FIG. 6A, a multi-processor carrier layout configuration 60 exhibiting a regular row and column structure is shown. For instance, processors $L_1$, $L_6$, $L_{11}$, and $L_{16}$ share the same column and processors $L_4$, $L_7$, $L_{10}$, and $L_{13}$ share the same row. Each carrier layout 61 is placed relative to other carrier layouts to form an overall configuration 62. The central carriers are placed within the configuration 60 to maximize the distance between individual processors and thereby avoid creating potential hotspots of contentioned pathways, such as by randomly placing each carrier layout, allocating cross-carrier layout memory access randomly, or both.

Referring next to FIGS. 6B and 6C, carrier layout configurations 63, 66 respectively exhibiting column-shifted and row-shifted structures are shown Referring first to FIG. 6B, each carrier layout 64 is shifted relative to other carrier layouts occurring in the same column to avoid cross-column carrier traffic. For instance, processors $L_1$, $L_4$, and $L_7$ do not share the same column. Referring next to FIG. 6C, each carrier layout 67 is shifted relative to other carrier layouts occurring in the same row to avoid cross-row carrier traffic. For instance, processors $L_3$, $L_5$, and $L_4$ do not share the same column. Finally, both the columns and rows of a carrier layout configuration could both be shifted.

Overlapped Carrier Layout Configurations

Figure 7:
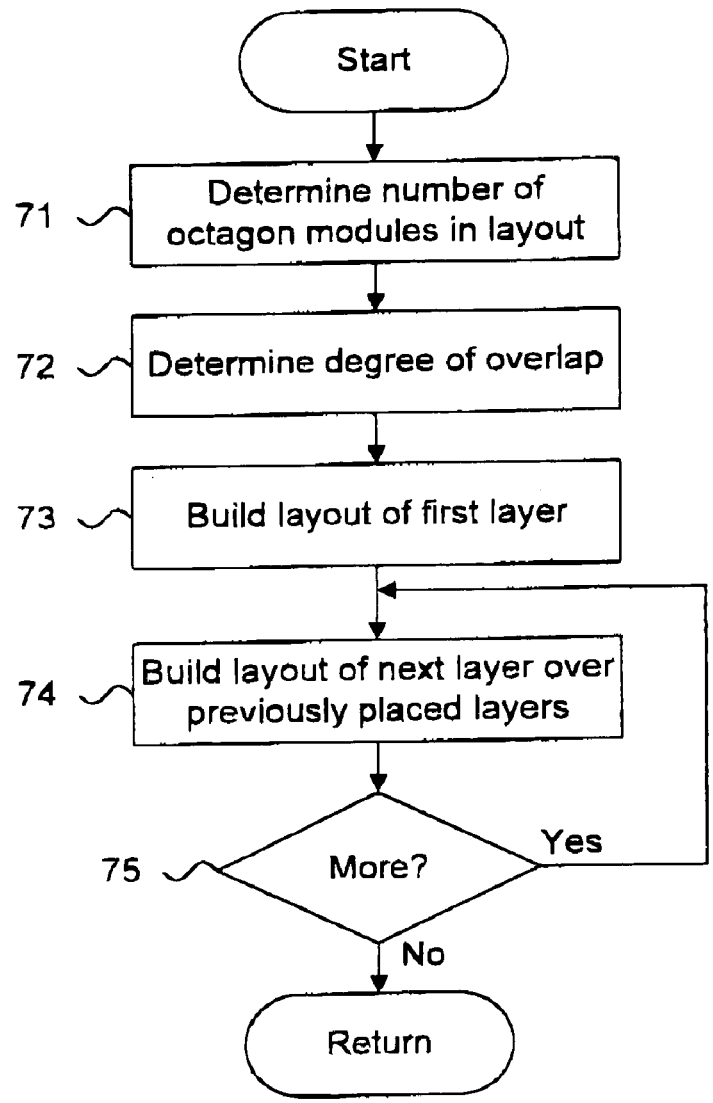
FIG. 7 is a flow diagram showing a method for determining an overlapped carrier layout configuration.

FIG. 7 is a flow diagram showing a method 70 for determining an overlapped carrier layout configuration. Those diamond carrier layouts exhibiting an even Hamming distance can be advantageously formed into interconnected and overlapping octagon configurations, such as further described above with reference to FIG. 5C. Overlapping octagon configurations allow multiple processors to access privileged memory regions within each octagon configuration and ensure that at least two processors are able to access those memory regions, thereby enhancing redundancy and reliability. The purpose of this method is to build a carrier layout configuration that includes a plurality of non-isometric octagon carrier layouts. Other shapes of carrier layouts could also be used.

The number of octagon modules in the layout is first determined (block 71) and the degree of overlap between those octagon modules to be placed in adjacent layers is determined (block 72). An initial first layer is built (block 73) and a next layer of octagon modules is placed over the previously placed layers (block 74) until all of the octagon modules have been placed (block 75). The method then terminates.

Figure 8A:
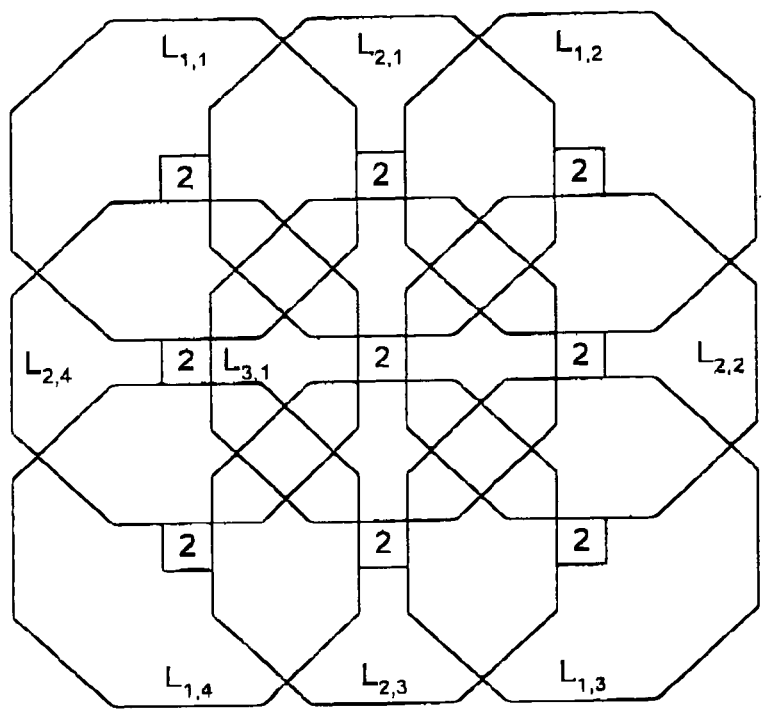
FIGS. 8A–C are block diagrams showing, by way of examples, overlapped carrier layout configurations.
Figure 8B:
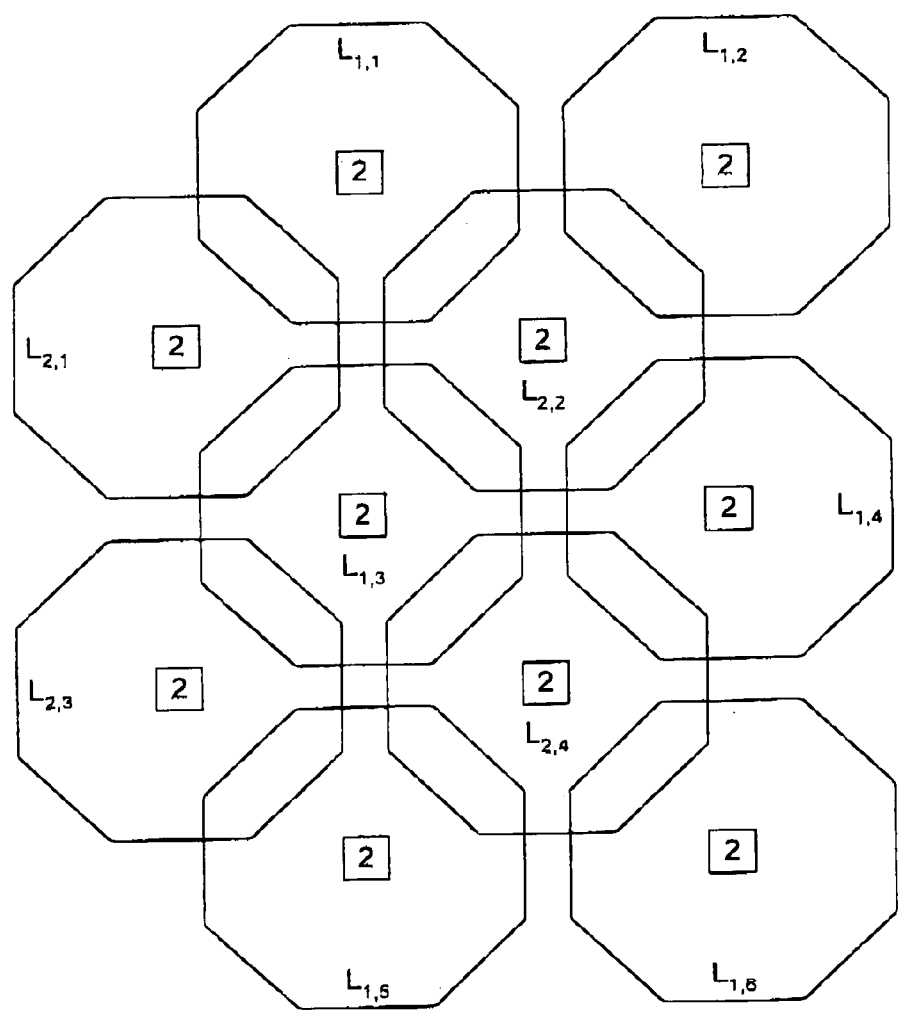
Figure 8C:
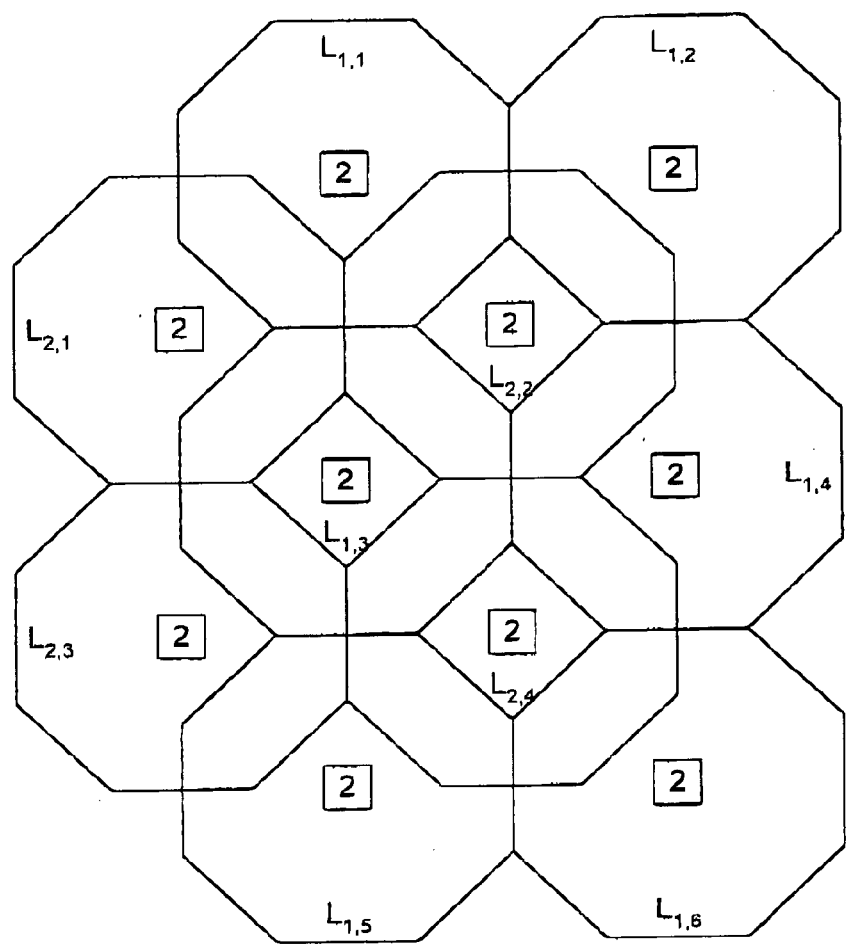

FIGS. 8A–C are block diagrams showing, by way of examples, overlapped carrier layout configurations 80, 81, 82. Referring first to FIG. 8A, a set of four octagon module layers is shown. An initial first layer is formed by placing the four carrier layouts in a square configuration. Second and third layers are formed by placing a pair of carrier layouts overlapping the row and column gap formed in the first layer. Finally, a carrier layout is placed in the center of the configuration to provide full connectivity between the carrier layouts. Referring next to FIG. 8B, a carrier layout with two overlapping layers is shown. A set of six carrier layouts is formed into an initial layer and a set of four additional carrier layouts is overlapped on top of the placed first layer of carrier layouts. The placement need not be symmetrical relative to the already-placed carrier layout Finally, referring to FIG. 8C, a further carrier layout configuration with two overlapping layers is shown. A first layer of carrier layouts is formed by directly interconnecting a set of six carrier layouts A second layer of carrier layouts being also formed by directly interconnecting the carrier layouts and is placed to overlap the first layer. The benefit of placing the octagon modules into configurations of carrier layout layers enhances the available redundant pathways into three dimensions.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), and DVDs (digital versatile discs or digital video discs).

While the invention has been particularly shown and described as referenced to the embodiments thereof, those skilled in the art will understand that the foregoing and other changes in form and detail may be made therein without departing from the spirit and scope of the invention.

What is claimed is:

1. A system for determining a carrier layout using cornered chip-to-chip input/output, comprising:
   a topology to orient each of a plurality of individual integrated circuit carriers communicatively interfaceable through cornered input/output ports at a uniform rotation relative to an edge of a carrier layout, each carrier defining a set of rectilinear edges; and
   carrier interconnections to place each carrier juxtaposed at an open corner to at least one other carrier within a rectilinear lattice topologically arranged in the carrier layout to substantially minimize Hamming distances between each of the carriers, wherein the Hamming distances are defined as a function of a minimal distance walk through the lattice between a pair of the carriers.

2. The system according to claim 1, wherein a surface yield of the carrier layout is determined as a ratio of a number of the carriers to available surface area of the carrier layout.

3. The system according to claim 2, wherein the surface yield ratio R is calculated in accordance with an equation:

$$R = \frac{NM}{NM + (N-1)(M-1) + (N-1) + (M-1) + 1} = \frac{1}{2}$$

where N and M are dimensions of the lattice.

4. The system according to claim 2, wherein an average of the Hamming distances $\overline{D}$ for each lattice is calculated in accordance with an equation:

$$\overline{D} = \frac{\sum_0^n h_i \cdot i}{\sum_0^n h_i}$$

where h comprises a number of hops in the walk and n comprises a length of the walk.

5. The system according to claim 1, wherein an alignment of a perimeter of at least one row or column of the carriers are uniformly shifted.

6. The system according to claim 1, wherein the lattice is defined to comprise two carriers juxtaposed to each carrier placed at an extremity of the lattice, three carriers juxtaposed to each carrier placed along an edge of the lattice, and four carriers juxtaposed to each carrier placed within an interior of the lattice.

7. The system according to claim 1, wherein the carrier layout overlaps with at least one other such carrier layout.

8. The system According to claim 1, wherein the set of rectilinear edges defines at least one of a square and a rectangle.

9. A method for determining a carrier layout using cornered chip-to-chip input/output, comprising:
    orienting each of a plurality of individual integrated circuit carriers communicatively interfaceable through cornered input/output ports at a uniform rotation relative to an edge of a carrier layout, each carrier defining a set of rectilinear edges; and
    placing each carrier juxtaposed at an open corner to at least one other carrier within a rectilinear lattice topologically arranged in the carrier layout to substantially minimize Hamming distances between each of the carriers, wherein the Hamming distances are defined as a function of a minimal distance walk through the lattice between a pair of the carriers.

10. The method according to claim 9, further comprising: determining a surface yield of the carrier layout as a ratio of a number of the carriers to available surface area of the carrier layout.

11. The method according to claim 10, wherein the surface yield ratio R is calculated in accordance with an equation:

$$R = \frac{NM}{NM + (N-1)(M-1) + (N-1) + (M-1) + 1} = \frac{1}{2}$$

where N and M are dimensions of the lattice.

12. The method according to claim 9, wherein an average of the Hamming distances $\overline{D}$ for each lattice is calculated in accordance with an equation:

$$\overline{D} = \frac{\sum_0^n h_i \cdot i}{\sum_0^n h_i}$$

where h comprises a number of hops in the walk and n comprises a length of the walk.

13. The method according to claim 9, further comprising: uniformly shifting an alignment of a perimeter of at least one row or column of the carriers.

14. The method according to claim 9, further comprising: defining the lattice comprising two carriers juxtaposed to each carrier placed at an extremity of the lattice, three carriers juxtaposed to each carrier placed along an edge of the lattice, and four carriers juxtaposed to each carrier placed within an interior of the lattice.

15. The method according to claim 9, further comprising: overlapping the carrier layout with at least one other such carrier layout.

16. The method according to claim 9, wherein the set of rectilinear edges defines at least one of a square and a rectangle.

17. A computer-readable storage medium holding code for performing the method according to claim 9.

* * * * *